US010322975B2

(12) United States Patent
Hinoki et al.

(10) Patent No.: US 10,322,975 B2
(45) Date of Patent: Jun. 18, 2019

(54) METHOD FOR PRODUCING LIQUID DISPERSION OF CERAMIC MICROPARTICLES

(71) Applicant: KYOTO UNIVERSITY, Kyoto (JP)

(72) Inventors: Tatsuya Hinoki, Kyoto (JP); Kazuya Shimoda, Kyoto (JP)

(73) Assignee: KYOTO UNIVERSITY, Kyoto (JP)

(*) Notice: Subject to any disclaimer, the term of this patent is extended or adjusted under 35 U.S.C. 154(b) by 0 days.

(21) Appl. No.: 14/771,546

(22) PCT Filed: Mar. 1, 2013

(86) PCT No.: PCT/JP2013/055691
§ 371 (c)(1),
(2) Date: Oct. 14, 2015

(87) PCT Pub. No.: WO2014/132445
PCT Pub. Date: Sep. 4, 2014

(65) Prior Publication Data
US 2016/0122251 A1    May 5, 2016

(51) Int. Cl.
C04B 35/583    (2006.01)
C01B 21/064    (2006.01)
(Continued)

(52) U.S. Cl.
CPC ........ C04B 35/583 (2013.01); C01B 21/0648 (2013.01); C01B 32/956 (2017.08);
(Continued)

(58) Field of Classification Search
CPC ............... C01B 21/0648; C01B 32/956; C01P 2004/62; C01P 2004/64; C04B 35/565; C04B 35/583
See application file for complete search history.

(56) References Cited

U.S. PATENT DOCUMENTS 6,110,266 A * 8/2000 Gonzalez-Blanco ........................ C09D 11/322
106/31.65
6,194,083 B1 * 2/2001 Yasuda .................. C04B 35/488
428/325
(Continued)

FOREIGN PATENT DOCUMENTS

DE    19800310 A1 *  7/1999
DE    19800310 A1     7/1999
(Continued)

OTHER PUBLICATIONS

Palceviskis et al. Journal of Physics: Conference Series 93 (2007). pp. 1-5.*
(Continued)

Primary Examiner — Michael A Salvitti
(74) Attorney, Agent, or Firm — John B. Hardaway, III; Todd A. Serbin; Nexsen Pruet, LLC

(57) ABSTRACT

The present invention provides a method for producing a dispersion of fine ceramic particles, the method comprising: adding fine ceramic particles having a mean particle size of less than 1 μm to a dispersion medium selected from the group consisting of a lower alcohol and water; and dispersing the fine ceramic particles in the dispersion medium using a rotor-stator homogenizer. The present invention enables the production of a highly homogeneous and stable dispersion of a nanosized ceramic powder, which is prone to aggregation and the homogeneous dispersion of which is difficult to form, by conducting a simple, uncomplicated operation.

10 Claims, 4 Drawing Sheets

(51) Int. Cl.
*C04B 35/565* (2006.01)
*C01B 32/956* (2017.01)

(52) U.S. Cl.
CPC ........ *C04B 35/565* (2013.01); *C01P 2004/52* (2013.01); *C01P 2004/62* (2013.01); *C01P 2004/64* (2013.01); *C01P 2006/10* (2013.01); *C01P 2006/12* (2013.01); *C01P 2006/22* (2013.01)

(56) References Cited

U.S. PATENT DOCUMENTS

| | | | | |
|---|---|---|---|---|
| 8,911,638 | B2* | 12/2014 | Lortz | B32B 17/069 252/62 |
| 2002/0160902 | A1* | 10/2002 | Lesniak | C04B 35/565 501/90 |
| 2004/0192534 | A1* | 9/2004 | Nixon | C04B 35/565 501/95.2 |
| 2004/0249041 | A1* | 12/2004 | Meloni | C08K 9/04 524/430 |
| 2006/0248663 | A1* | 11/2006 | Tremblay | A61K 8/19 8/405 |
| 2008/0031806 | A1* | 2/2008 | Gavenonis | B01J 21/063 423/608 |
| 2009/0261309 | A1* | 10/2009 | Lortz | B32B 17/069 252/604 |
| 2010/0204033 | A1* | 8/2010 | Katusic | B01J 21/066 501/135 |
| 2011/0049056 | A1* | 3/2011 | Wyndham | B01D 15/08 210/656 |
| 2011/0318421 | A1* | 12/2011 | Parsonage | A61K 9/5115 424/490 |
| 2012/0244056 | A1* | 9/2012 | Nagao | B82Y 30/00 423/263 |
| 2016/0060112 | A1* | 3/2016 | Nishi | C08K 3/38 252/74 |
| 2016/0122251 | A1* | 5/2016 | Hinoki | C01B 31/36 501/88 |
| 2016/0263555 | A1* | 9/2016 | Wyndham | B01J 20/288 |

FOREIGN PATENT DOCUMENTS

| | | |
|---|---|---|
| EP | 1238953 A1 | 9/2002 |
| EP | 2511091 A2 | 10/2012 |
| JP | S6395105 | 4/1988 |
| JP | 07330543 | 12/1995 |
| JP | 3023435 B2 | 1/2000 |
| JP | 2002 500157 A | 1/2002 |
| JP | 2002069375 | 3/2002 |
| JP | 2002526630 | 8/2002 |
| JP | 2004331479 | 11/2004 |
| JP | 2004537489 | 12/2004 |
| JP | 2008169115 | 7/2008 |
| JP | 2009013025 | 1/2009 |
| JP | 2009256534 | 11/2009 |
| JP | 2011502043 | 1/2011 |
| JP | 2011140432 | 7/2011 |
| WO | WO 03/013845 A1 | 2/2003 |
| WO | WO 2009/058257 A2 | 5/2009 |
| WO | WO 2011/070439 A1 | 6/2011 |

OTHER PUBLICATIONS

Espacenet machine translation of DE 19800310A1 to Gonzalez-Blanco. Obtained on Oct. 25, 2017.*
Ciofani, Gianni et al., "Preparation of Boron Nitride Nanotubes Aqueous Dispersions for Biological Applications", Journal of Nanoscience and Nanotechnology, 2008, pp. 6223-6231, vol. 8, No. 12, American Scientific Publishers, United States of America.
Gerwann, Jochen; Extended European Search Report; EP13876386; dated Oct. 4, 2016; 8 pages; European Patent Office.

* cited by examiner

METHOD FOR PRODUCING LIQUID DISPERSION OF CERAMIC MICROPARTICLES

TECHNICAL FIELD

The present invention relates to a method for producing a dispersion of fine ceramic particles.

BACKGROUND ART

Recent years have seen remarkable progress in the technical sophistication and downsizing of electronic devices, such as personal computers, cellular phones, and digital cameras. This progress has been accompanied by demands for the technical sophistication and downsizing of ceramics (key parts for electronic devices) for use in the electronics industry.

For example, because of its large band gap and excellent properties, such as electrical breakdown characteristic, heat resistance, and radiation resistance, silicon carbide has attracted attention as an electronic device material, for example, for compact and high-power semiconductors.

In addition, because of its excellent connectability to other compound semiconductors excellent in optical properties, silicon carbide has also attracted attention as an optical device material.

Silicon carbide is also excellent in mechanical properties, such as abrasion resistance, and thermal properties, such as heat resistance and thermal conductivity, while being significantly chemically stable and excellent in chemical resistance; silicon carbide thus has been used as a structural material, for example, for abrading agents, refractory materials, mechanical seals, and heat exchangers.

Known industrial methods for producing a silicon carbide powder include the Acheson process, silica reduction techniques, and silicon carbonization techniques. These methods, however, have submicron order limitations in mean particle size. Thus, dominant powders of silicon carbide have a mean particle size of submicron order or more.

There have been studies on new applications of silicon carbide powders in coating compositions for forming films, such as abrasion-resistant coating films, scratch-resistant coating films, heat-resistant coating films, and hardened coating films, as well as fillers for composite plating. In line with progress in nanotechnology, nanosized silicon carbide particles have also attracted great interest.

Examples of known methods for producing nanosized silicon carbide particles include a method using thermal plasma, which has a high temperature and high activity in a non-oxidizing atmosphere, and allows easy introduction of a fast cooling process (see Patent Literature 1).

The production method is useful for producing silicon carbide nanoparticles having a mean particle size of about 5 to 100 nm with excellent crystallinity, and the method can provide silicon carbide nanoparticles with a very small impurity content if a high-purity starting material is chosen.

Another known method is a silica precursor calcination method comprising the step of calcining a mixture of a silicon-containing substance, such as an organosilicon compound, silica sol, and silica hydrogel, a carbon-containing substance, such as phenolic resin, and a metal compound, such as lithium, for suppressing the growth of silicon carbide particles in a non-oxidizing atmosphere to thereby obtain silicon carbide particles (see Patent Literature 2).

This method is thought to provide an ultrafine silicon carbide powder containing no coarse particles.

To form a film, such as an abrasion-resistant coating film, a scratch-resistant coating film, a heat-resistant coating film, or a hardened coating film, using the nanosized silicon carbide powders obtained by the above-described methods, the following method is usable: applying a dispersion obtained by dispersing a nanosized silicon carbide powder in a solvent onto an object to thereby form a coating film; and heating the coated film to form a film of silicon carbide particles.

However, the nanosized silicon carbide particles obtained by the above-described methods are agglomerated with a stronger cohesive force between particles than oxide nanoparticles, such as alumina and silica. It is thus difficult to prepare a dispersion in which nanosized particles are homogeneously dispersed.

In addition, the particles of conventional nanosized silicon carbide powders are prone to aggregation. The powders, when dispersed in a solvent, become extremely viscous, thereby making it difficult to prepare a highly concentrated dispersion containing a fine silicon carbide powder in an amount of about 8 wt % or more.

Thus, it is only possible to prepare a low-concentrated dispersion for the above-described applications. The low concentration makes it difficult to thicken a coating film during formation. To thicken the coating film, a coating liquid must be applied and dried repeatedly. As noted, the nanosized silicon carbide particles have many drawbacks.

Examples of methods for increasing the dispersibility of silicon carbide particles include a method comprising oxidizing silicon carbide particles in an oxidizing atmosphere to form an oxidized surface layer so that the compatibility of the particles with the solution is increased (see Patent Literature 3).

However, this method is disadvantageous in that when silicon carbide particles are heated in an oxidizing atmosphere, melt-bonding occurs in the oxidized surface layer, leading to aggregation of the silicon carbide nanoparticles, which thereby makes it difficult to disperse the nanoparticles in a solution.

CITATION LIST

Patent Literature

Patent Literature 1: Japanese Patent No. 3023435
Patent Literature 2: JPS63-95105A
Patent Literature 3: JPH07-330543A

SUMMARY OF INVENTION

Technical Problem

The present invention was completed in view of the above-described status quo of the related art. The main object of the present invention is to provide a method for producing, without conducting a cumbersome operation, a highly homogeneous and stable dispersion of fine ceramic particles, in particular, nanosized ultrafine ceramic particles, in spite of the fact that they are prone to aggregation and present difficulties in forming a homogeneous dispersion.

Solution to Problem

The present inventors conducted extensive research to achieve the above-described object, and found that, among nanosized ceramic particles, particularly nanosized particles of silicon carbide, boron nitride, and the like, with which homogeneous dispersions have been considered difficult to form, can form a homogeneous dispersion with a narrow particle size distribution width, when dispersed in water or a lower alcohol as a dispersion medium, using a rotor-stator homogenizer that employs the interaction between a stationary blade (outer blade) and a rapidly rotating rotary blade (inner blade).

The inventors especially found that when a dispersion is prepared using a lower alcohol as a dispersion medium with a rotor-stator homogenizer, the convection of the dispersion is suppressed by cooling to thereby suppress the aggregation of ultrafine particles, which thus provides a dispersion in which particles with a fine particle size are homogeneously dispersed.

The inventors also found that when water is used as a dispersion medium, preparing a dispersion in the presence of either or both of a specific surfactant and a specific polymeric dispersant with a rotor-stator homogenizer can provide a dispersion in which particles with a fine particle size are homogeneously dispersed.

The inventors conducted further research on the basis of these findings, and completed the present invention.

Specifically, the present invention provides the following method for producing a dispersion of fine ceramic particles.
Item 1.

A method for producing a dispersion of fine ceramic particles, the method comprising: adding fine ceramic particles having a mean particle size of less than 1 um to a dispersion medium selected from the group consisting of a lower alcohol and water; and dispersing the fine ceramic particles in the dispersion medium using a rotor-stator homogenizer.
Item 2.

The method for producing a dispersion of fine ceramic particles according to Item 1, wherein the fine ceramic particles are in the form of fine silicon carbide powder or fine boron nitride powder, and have a mean particle size of 300 nm or less.
Item 3.

The method for producing a dispersion of fine ceramic particles according to Item 1 or 2, wherein the dispersion medium is a lower alcohol, and the fine ceramic particles are dispersed while the temperature of the dispersion is being controlled to 50° C. or lower.
Item 4.

The method for producing a dispersion of fine ceramic particles according to Item 3, wherein the lower alcohol is isopropyl alcohol.
Item 5.

The method for producing a dispersion of fine ceramic particles according to Item 1 or 2, wherein the dispersion medium is water, and the fine ceramic particles are dispersed in the presence of one or both of a polymeric dispersant and a surfactant.
Item 6.

The method for producing a dispersion of fine ceramic particles according to Item 5, wherein the polymeric dispersant contains cationic groups, and the surfactant is a nonionic surfactant.
Item 7.

The method for producing a dispersion of fine ceramic particles according to Item 6, wherein the polymeric dispersant is polyethylenimine, and the surfactant is an alkyl glycoside.
Item 8.

The method for producing a dispersion of fine ceramic particles according to Item 7, wherein the fine ceramic particles are fine silicon carbide particles or fine boron nitride particles, and are dispersed in the presence of the polyethylenimine and the alkyl glycoside.
Item 9.

A dispersion of fine ceramic particles obtained by the method according to any one of Items 1 to 8.

The following describes a method for producing a dispersion of fine ceramic particles according to the present invention in detail.

1. Fine Ceramic Particles

In the method of the present invention, fine ceramic particles used as a dispersed material have a mean particle size of less than 1 μm. The method according to the present invention enables easy production of a homogeneous dispersion containing particles of a nanoscopic size, using fine ceramic particles having a mean particle size less than 1 μm, with which a homogeneous dispersion is considered difficult to form.

In particular, the method according to the present invention enables the production of a homogeneous dispersion containing particles of a small mean particle size even when using ultrafine ceramic particles having a mean particle size of 300 nm or less, or even about 100 nm or less, which are prone to aggregation.

In the present specification, the mean particle size of fine ceramic particles was determined by arbitrarily selecting 100 particles from fine ceramic particles in an electron micrograph image, measuring the maximum length of each particle, and calculating the average.

The type of fine ceramic particle for use in the present invention is not particularly limited.

The method of the present invention can provide a homogeneous dispersion of even silicon carbide (SIC), boron nitride (BN), and the like, which are prone to aggregation in the preparation of their dispersion, and are thus considered difficult to use for preparing a dispersion containing homogeneously dispersed ultrafine particles.

Thus, the method is highly useful.

2. Method for Producing Dispersion

In the method for producing a dispersion according to the present invention, a lower alcohol or water is used as a dispersion medium, and fine ceramic particles are added to the medium as a dispersed material. The fine ceramic particles are homogeneously dispersed using a rotor-stator homogenizer to prepare a dispersion.

The rotor-stator homogenizer is equipped with a cylindrical stationary blade (outer blade) and a rapidly rotating rotary blade (inner blade), which is provided in the interior space of the stationary blade, and the cylindrical stationary blade is provided with a plurality of slit-like holes.

A sample placed in the interior space of the stationary blade radially moves because of the centrifugal force of the rapidly rotating inner blade, and is expelled from the slit-like holes of the stationary blade.

To the interior space of the stationary blade (outer blade) from which the sample is expelled, the sample enters from the open tip portion of the stationary blade. The ejection and suction of the sample occur repeatedly.

The sample is crushed into coarse particles by the tip of the rotary blade (inner blade), and pulverized into fine particles between the inner blade and the outer blade immediately before the sample is expelled from the slits of the stationary blade (outer blade) through the inner rotary blade (inner blade).

The pulverized particles are further finely grinded and homogenized by impacts such as ultrasound waves and high-frequency waves generated between the rapidly rotating rotary blade (inner blade) and the slits of the stationary blade (outer blade).

Ceramic nanoparticles having a mean particle size of less than 1 µm intended for use in the present invention, when dispersed in a lower alcohol or water as a dispersion medium using the interaction between the stationary blade (outer blade) and the rapidly rotating rotary blade (inner blade) of a rotor-stator homogenizer, forms a highly homogeneous dispersion having a smaller mean particle size, with a narrower particle size distribution width, than ceramic nanoparticles dispersed using another dispersing device, such as a dispersing device with a propeller or an ultrasonic dispersing device.

The conditions for producing a dispersion using a rotor-stator homogenizer are not particularly limited. Although the conditions depend on the inner diameter of the stationary blade and the rotary blade, the slit shape, and the like, of the device actually used, the conditions may suitably be determined in accordance with the type of fine ceramic particles to be used, the type of dispersion medium, the concentration of the dispersion, and the like, such that a homogeneous dispersion is formed.

The following are preferable conditions for preparing a dispersion for the case where a lower alcohol is used as a dispersion medium and the case where water is used as a dispersion medium, respectively.

(1) Using a Lower Alcohol as a Dispersion Medium

In the present invention, particularly when silicon carbide (SiC), boron nitride (BN), and the like, are used for a dispersing treatment, the use of a lower alcohol as a dispersion medium provides a dispersion in which fine ceramic particles are homogeneously dispersed, because of the excellent compatibility between the ultrafine ceramic particles and the lower alcohol.

Specific examples of preferable lower alcohols include linear or branched alcohols having a carbon number of 2 to 4, such as ethanol, 2-propanol (isopropanol), 1-butanol, and 2-butanol.

In particular, when using ultrafine particles of silicon carbide, boron nitride, and the like, as ultrafine ceramic particles, the use of 2-propanol (isopropanol) as a dispersion medium provides an excellent dispersion.

In contrast, the use of an organic solvent other than a lower alcohol, such as acetone or hexane, leads to poor wettability of ultrafine ceramic particles. Even when the particles are dispersed using a rotor-stator homogenizer, the use of such an organic solvent is likely to provide a poorly homogenized dispersion with a wide particle size distribution.

The amount of fine ceramic particles in a dispersion is not particularly limited; however, to obtain an excellent dispersion, the amount of fine ceramic particles is preferably about 30 wt % or less, more preferably about 15 wt % or less, and yet more preferably about 10 wt % or less based on the total amount of the dispersion containing the fine ceramic particles.

The lower limit of the amount of fine ceramic particles is not particularly limited; however, fine ceramic particles in an amount of typically about 0.1 wt % or more provide an excellent dispersion.

The resulting dispersion preferably has a viscosity in the range of about 1 to 200 mPa·s, as measured particularly at 20° C. at a shear rate of 50 $S^{-1}$. A dispersion having a viscosity within this range is particularly stable.

The viscosity of the dispersion tends to be higher as the mean particle size of the dispersed particles is smaller, with the amount of dispersed particles being larger.

To disperse ultrafine ceramic particles having a mean particle size of about 300 nm or less while achieving the viscosity within the above-described range, the amount of ultrafine ceramic particles in a dispersion is preferably about 15 wt % or less, and more preferably about 10 wt % or less.

When particles are dispersed with a rotor-stator homogenizer by the method using a lower alcohol as a dispersion medium, the particle oscillation caused by dispersive energy may increase the temperature of the dispersion, and thereby cause the volatilization of the solvent or the convection of the dispersion; thus, the dispersing efficiency of the homogenizer is likely decreased. When this happens, it is preferable to prepare a dispersion while cooling the container holding the dispersion with ice water, or the like, to suppress the convection of the dispersion. This enables efficient preparation of a homogeneous dispersion.

The temperature of the dispersion for this case is not particularly limited, and may be, for example, about 50° C. or less, preferably 40° C. or less, and more preferably 30° C. or less. However, depending on the type of dispersion medium used, the temperature is preferably determined such that evaporation is suppressed. For example, when ethanol is used as a dispersion medium, the temperature is preferably about 40° C. or less. The lower limit of the dispersion temperature may be, although not particularly limited to, about 20° C. or more.

The time period for preparing a dispersion is not particularly limited. A dispersing treatment with a homogenizer may be conducted until a fine and homogeneous dispersion with a narrow particle size distribution width is formed, depending on the shape of the stationary blade and rotary blade and the rotating speed of the rotary blade of the homogenizer to be used, the type of fine ceramic particles, and the concentration of the dispersion.

For example, a dispersing treatment may be conducted for about 5 to 20 minutes with a rotor-stator homogenizer. Optionally, the dispersing treatment with a rotor-stator homogenizer may be temporarily halted, and then the dispersing treatment can be repeated to suppress an increase in the dispersion temperature. Conducting this procedure provides a highly homogeneous dispersion.

(2) Using Water as a Dispersion Medium

In the method using water as a dispersion medium, the amount of ultrafine ceramic particles in the dispersion may be as described above for the case where a lower alcohol is used as a dispersion medium.

When water is used as a dispersion medium, it is particularly preferable to add one or both of a polymeric dispersant and a surfactant to the dispersion. This enables the preparation of a homogeneous and stable dispersion having a smaller mean particle size of dispersed particles with a narrower particle size distribution width.

When water is used as a dispersion medium, the pH of the dispersion is not particularly limited. However, it is typically preferable to prepare a dispersion with a pH in the neutral range of about pH 9 to the mild acidic range of about pH 2 taking into consideration, for example, the effects on the device to be used and the working environment.

The type of polymeric dispersant is not particularly limited. However, when a dispersion having a pH of about 2 to 9 is prepared, the use of a polymeric dispersant containing cationic groups can provide a stable dispersion with the surface of ultrafine ceramic particles exhibiting a positive zeta potential.

In particular, when fine SiC particles or fine BN particles are used as fine ceramic particles, the resulting dispersion, when having a pH of about 2 to 9, typically has a zero to a negative zeta potential, with the value being low. In addition, the zeta potential is prone to fluctuation depending on the pH, and thus the resulting dispersion is less stable. A polymeric dispersant containing cationic groups is easily adsorbed on fine ceramic particles, and the zeta potential of the surface can be a relatively higher positive value. Thus, the use of such a polymeric dispersant can provide a stable dispersion that is hardly affected by pH fluctuations.

When a dispersion of fine SiC particles is used as a starting material for a sintered object, the dispersion typically contains $Al_2O_3$, $Al_2O_3$—$Y_2O_3$, or the like, as a sintering aid. The sintering aid, when having a pH of about 2 to 9, is likely to have a positive zeta potential, and thus easily clings to SiC fine particles having a negative zeta potential. In this case also, when a polymeric dispersant containing cationic groups is added, the zeta potential of fine SiC particles becomes positive, and the resulting dispersion, even when containing a sintering aid, can be stable.

The polymeric dispersant containing cationic groups is not particularly limited. However, examples of the dispersants to be used include synthetic polymers having a high cation density, such as polvethylenimine, polyvinylamine, and polyallylamine; and polyornithine and polylysine. The molecular weight of these polymeric dispersants is not particularly limited.

For example, usable dispersants have a weight average molecular weight of about 300 to 100,000. In particular, when fine ceramic particles having a mean particle size of about 300 nm or less are used, a dispersant having an excessively high molecular weight likely increases the viscosity. It is thus preferable to use a polymeric dispersant having a weight average molecular weight of about 300 to 10,000.

The surfactant is not particularly limited; however, to prevent the re-aggregation of dispersed ultrafine ceramic particles, a surfactant providing a large steric hindrance is preferable. Examples of such surfactants include alkyl glycosides, which are non-ionic surfactants.

Specific examples of alkyl glycosides include n-octyl-β-D-glucoside, n-octyl-β-D-maitoside, n-decyl-β-D-glucoside, n-decyl-β-D-maltoside, n-heptyl-β-D-thioglucoside, n-octyl-β-D-thioglucoside, and n-nonyl-β-D-thiomaltoside.

The molecular weight of the surfactant is not particularly limited. However, when the molecular weight is excessively high, the viscosity of the dispersion is likely to increase. Thus, typically, the surfactant preferably has a weight average molecular weight of about 100 to 1,000, more preferably about 200 to 800, and particularly more preferably about 250 to 600.

The amount of the polymeric dispersant and surfactant to be used is not particularly limited. However, to obtain a highly homogeneous dispersion with a narrow particle size distribution, the polymeric dispersant is preferably added in an amount of about 0.1 to 5 parts by weight, and more preferably about 0.5 to 3 parts by weight, per 100 parts by weight of fine ceramic particles used as a dispersed material.

The surfactant is preferably added in an amount of about 0.1 to 5 parts by weight, and more preferably about 0.5 to 3 parts by weight per 100 parts by weight of fine ceramic particles.

In the present invention, it is preferable to use a polymeric dispersant in combination with a surfactant in the above-described amount ranges. In particular, it is preferable to use a polymeric dispersant containing cationic groups in combination with a nonionic surfactant.

In particular, when dispersing fine SiC particles or fine BN particles, it is preferable to use polyethylenimine in combination with an alkyl glycoside. The use of such combinations confers a positive zeta potential to dispersed fine ceramic particles, while preventing re-aggregation by the steric hindrance effect, thereby providing a stable dispersion.

When water is used as a dispersion medium, as with the case where a lower alcohol is used as a dispersion medium, the amount of fine ceramic particles in the dispersion is preferably about 30 wt % or less, more preferably about 15 wt % or less, and yet more preferably about 10 wt % or less, based on the total amount of the dispersion containing the fine ceramic particles.

The lower limit of the amount of fine ceramic particles may be about 0.1 wt % or more.

The resulting dispersion preferably has a viscosity in the range of about 1 to 200 mPa·s, as measured at 20° C. at a shear rate of 50 $S^{-1}$ from the standpoint of obtaining a dispersion with excellent stability, as with the case where a lower alcohol is used as a dispersion medium.

Thus, when ultrafine ceramic particles having a mean particle size of about 300 nm or less are dispersed in water as a dispersion medium, the amount of ultrafine ceramic particles in the dispersion is preferably about 15 wt % or less, and more preferably 10 wt % or less, as with the case where a lower alcohol is used as a dispersion medium.

When a dispersion is prepared using water as a dispersion medium, the temperature of the dispersion is preferably about 50° C. or less, more preferably 40° C. or less, and yet more preferably 30° C. or less, from the standpoint of suppressing a decrease in dispersing efficiency due to volatilization or convection, as with the case where a lower alcohol is used as a dispersion medium.

The lower limit of the dispersion temperature may typically be about 20° C. or more.

Regarding the time period for preparing a dispersion, a dispersing treatment may be conducted with a homogenizer until a fine homogeneous dispersion is formed, as with the case where a lower alcohol is used as a dispersion medium. For example, a dispersing treatment may be conducted with a rotor-stator homogenizer for about 5 to 20 minutes.

Optionally, the dispersing treatment with a rotor-stator homogenizer may be temporarily halted, and then the dispersing treatment can be repeated to suppress an increase in dispersion temperature. Conducting this procedure provides a highly homogeneous dispersion.

3. Dispersion of Fine Ceramic Particles

The above-described method, by using fine submicron ceramic particles having a mean particle size of less than 1 μm, can provide a highly homogeneous and stable dispersion of particles with a small particle size and a narrow particle size distribution width.

Even when ultrafine ceramic particles that are less likely to become aggregated particles in a dispersion, with, for example, a mean particle size of 100 nm or less, are used as a dispersed material, the resulting dispersion can be homogeneous with fewer aggregated particles.

The dispersion obtained by the above-described method is a homogenous and stable dispersion, which has a variety of applications depending on the type of fine ceramic particles used as a dispersed material.

SiC dispersions can be effectively used, for example, in coating composition materials and fillers for forming films such as abrasion-resistant coating films, scratch-resistant coating films, heat-resistant coating films, and hardened coating films, and in matrix portions of fiber-reinforced ceramic composite materials. BN dispersions can be effectively used, for example, in materials for solid lubricants, electrical insulating heatsinks, and cut-off wheels, and fillers.

Advantageous Effects of Invention

The method for producing a dispersion of fine ceramic particles according to the present invention enables the production of a highly homogeneous and stable dispersion using a simple, uncomplicated operation, even when using a nanosized ceramic powder that is prone to aggregation and whose homogeneous dispersion is difficult to form; this includes, in particular, fine particles of silicon carbide (SiC), boron nitride (BN), and the like, the homogeneous dispersions of which have been considered difficult to form.

The dispersion obtained by the method according to the present invention is thus highly useful as a material for producing sophisticated products in the various technical fields where dispersions of fine ceramic particles have been conventionally used.

DESCRIPTION OF EMBODIMENTS

The following Examples describe the present invention in more detail.

EXAMPLE 1

As a dispersion medium, acetone, hexane and isopropanol were used. 100 ml of each solvent was placed into an individual beaker, and 0.3 g of an ultrafine SiC powder was added thereto. The ultrafine SiC particles added had a mean particle size of 40 nm (particle size width: 20 to 100 nm), a BET specific surface area of 93 $m^2/s$, an apparent density of 0.08 $g/cm^3$, a true density of 3.0 $g/cm^3$, and a C/Si ratio of 1.0.

Figure 1:
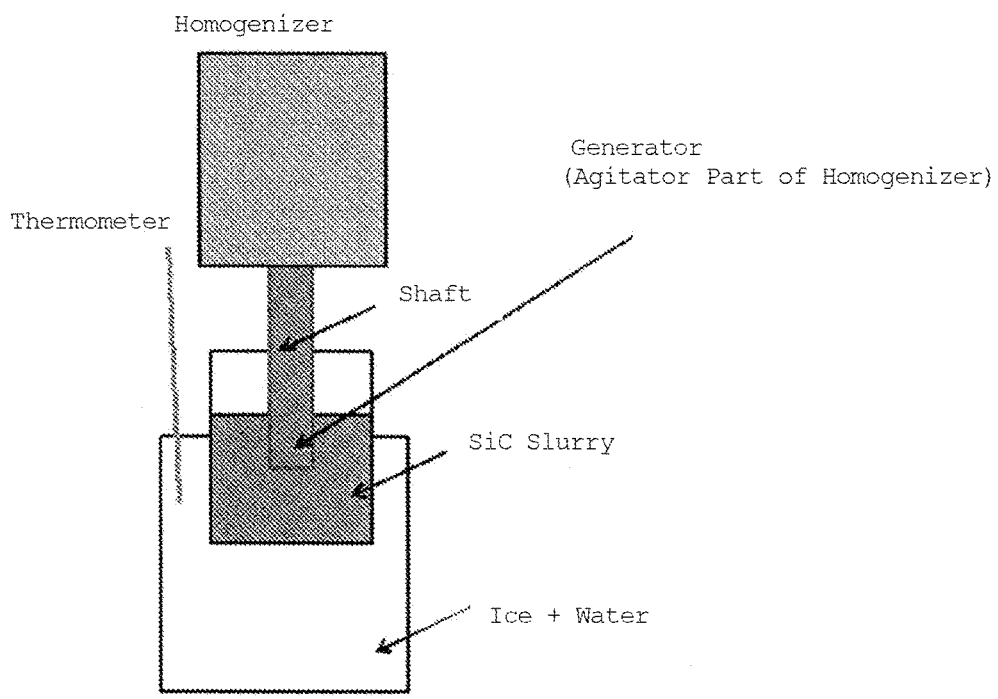
FIG. 1 is a diagram showing the structure of the dispersing device used in Example 1.

The device shown in FIG. 1 was used. Each of the beakers containing the dispersion of the ultrafine SiC powder was placed into a thermostat bath that contained ice and water. The tip portion (generator part) of a rotor-stator homogenizer was placed into the dispersion contained in the 250 ml-beaker to a depth of 2 cm, and the ultrafine SiC powder was dispersed by operating the homogenizer.

The dispersing treatment was conducted using the TS Ultra Turrax T25 (manufactured by IKA) rotor-stator homogenizer by controlling its rotating speed within the range of 500 to 25,000 rpm while maintaining the dispersion temperature within the range of 20° C. or more to 40° C. or less. The dispersing treatment using the homogenizer was conducted three times for 5 minutes each.

Figure 2:
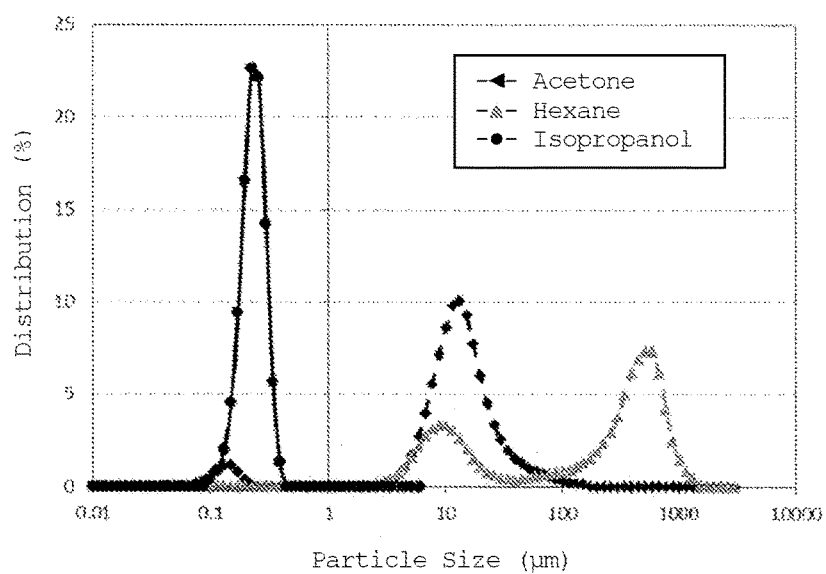
FIG. 2 is a graph showing the measurement results of particle size distribution measured in Example 1.

After the treatment was completed, and the dispersion temperature was stabilized, the dispersion was collected using a dropper. The particle size of the dispersed particles in the dispersion was determined by laser scattering with a laser diffraction/scattering particle size distribution analyzer (LA-920) manufactured by Horiba, Ltd. FIG. 2 shows the results.

As is clear from FIG. 2, when isopropanol was used as a dispersion medium, the particles dispersed in the obtained dispersion had a small particle size and a narrow particle size distribution width. In contrast, when acetone or hexane was used as a dispersion medium, the particles dispersed in the obtained dispersion had a large particle size and a wide particle size distribution width.

The results reveal that the use of isopropanol as a dispersion medium in forming a dispersion of an ultrafine SiC powder provides an excellent dispersion.

EXAMPLE 2

0.3 g of an ultrafine SiC powder was added to a beaker containing 100 ml of pure water. The same ultrafine SiC powder used in Example 1 was used. To this beaker, one or both of polyethylenimine and alkyl glycoside were added. Polyethylenimine and alkyl glycoside were added in the following four different patterns.
(1) 0.009 g of polyethylenimine
(2) 0.0045 g of polyethylenimine
(3) 0.0045 g of alkyl glycoside
(4) 0.006 g of polyethylenimine and 0.003 g of alkyl glycoside The polyethylenimine used, which was manufactured by Wako Pure Chemical Ind. Ltd., had a weight average molecular weight of 600, and the alkyl glycoside used was n-octyl-β-D-thioglucoside, which was manufactured by Wako Pure Chemical Ind. Ltd. (weight average molecular weight: 308).

Each of the samples was subjected to a dispersing treatment using the rotor-stator homogenizer to disperse the ultrafine SiC powder in the same manner as in Example 1.

Figure 3:
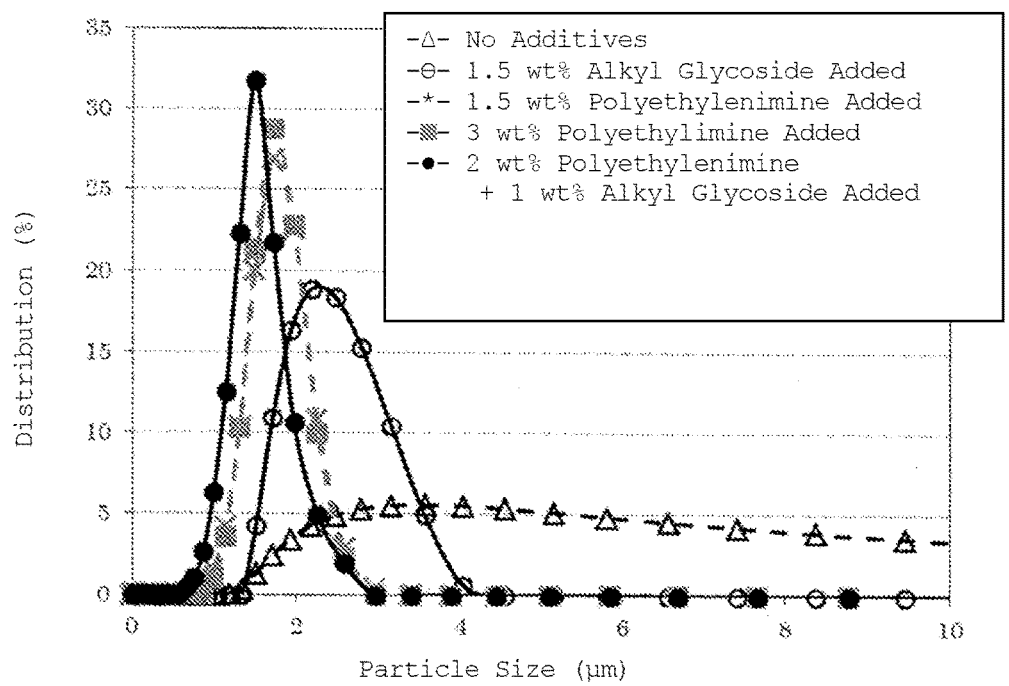
FIG. 3 is a graph showing the measurement results of particle size distribution measured in Example 2.

After completion of the dispersing treatment, the dispersion was collected using a dropper, and the particle size of the dispersed particles in the dispersion was determined by a laser scattering light technique with the same analyzer used in Example 1. FIG. 3 shows the results.

As is clear from FIG. 3, when water was used as a dispersion medium without adding polyethylenimine and alkyl glycoside, the particle size distribution width of the dispersed particles was wider, and a dispersion with a homogeneous particle size was not obtained.

In contrast, when polyethylenimine or alkyl glycoside was added, the homogeneity of the dispersed particles was improved. In particular, when both polyethylenimine and alkyl glycoside were added at the same time, the particles dispersed in the obtained dispersion had a small particle size and a narrow particle size distribution width.

EXAMPLE 3

0.3 g or 10 g of ultrafine SiC particles, which were the same as those used in Example 1, was added to 100 ml of isopropanol as a dispersion medium, thereby preparing samples.

Both polyethylenimine and alkyl glycoside, which were the same as those used in Example 2, were added to 100 ml of pure water as a dispersion medium, and 0.3 g or 10 g of ultrafine SiC particles, which were the same as those used in Example 1, was further added thereto, thereby preparing samples.

Polyethylenimine and alkyl glycoside were respectively added in amounts of 0.006 g and 0.003 g when the ultrafine SiC particles were added in an amount of 0.3 g, and polyethylenimine and alkyl glycoside were respectively added in amounts of 0.2 g and 0.1 g when the ultrafine SiC particles were added in an amount of 10 g.

Each of the samples was subjected to a dispersing treatment using the rotor-stator homogenizer to disperse the ultrafine SiC particles in the same manner as in Example 1.

Each of the dispersions prepared by the above-described method was placed in a plastic container with a lid, and allowed to stand in the air at 20° C. for 0 or 48 hours, followed by measurement of the viscosity of the slurry at a shear rate of 50 $s^{-1}$ with the Brookfield digital viscometer HADV-I. Table 1 shows the results.

TABLE 1

| | Solvent | | | |
|---|---|---|---|---|
| | Isopropanol | | 2 wt % polyethylenimine and 1 wt % alkyl glycoside added to pure water | |
| | Time Period After Dispersion Treatment | | | |
| | 0 hours | 48 hours | 0 hours | 48 hours |
| Viscosity of 0.3 wt % Dispersion of Ultra Fine SiC Particles (mPa · s) | 6.56 | 6.63 | 14.8 | 14.9 |
| Viscosity of 10 wt % Dispersion of Ultra Fine SiC Particles (mPa · s) | 20.2 | 20.3 | 30.3 | 31.5 |

As is clear from the results, all of the 0.3 wt % dispersions of ultrafine SiC particles prepared in the same manner as in Examples 1 and 2 hardly exhibited any change between the viscosity immediately after the preparation of the dispersions and the viscosity 48 hours after the preparation in cases where isopropanol or water was used as a dispersion medium.

The results indicate that highly stable dispersions were formed.

The results also revealed that 10 wt % dispersions of ultrafine SiC particles hardly exhibited any change between the viscosity immediately after the preparation of the dispersions and the viscosity 48 hours after the preparation in cases where isopropanol or water was used as a dispersion medium.

The results indicate that highly stable dispersions were formed.

EXAMPLE 4

As a dispersion medium, acetone, hexane and isopropanol were used. 100 ml of each solvent was placed into an individual beaker, and 0.3 g of an ultrafine BN powder was added thereto. The ultrafine BN particles added had a mean particle size of 50 nm (particle size width: 20 to 300 nm), a BET specific surface area of 173 $m^2/s$, an apparent density of 0.05 $g/cm^3$, and a true density of 2.0 $g/cm^3$.

Figure 4:
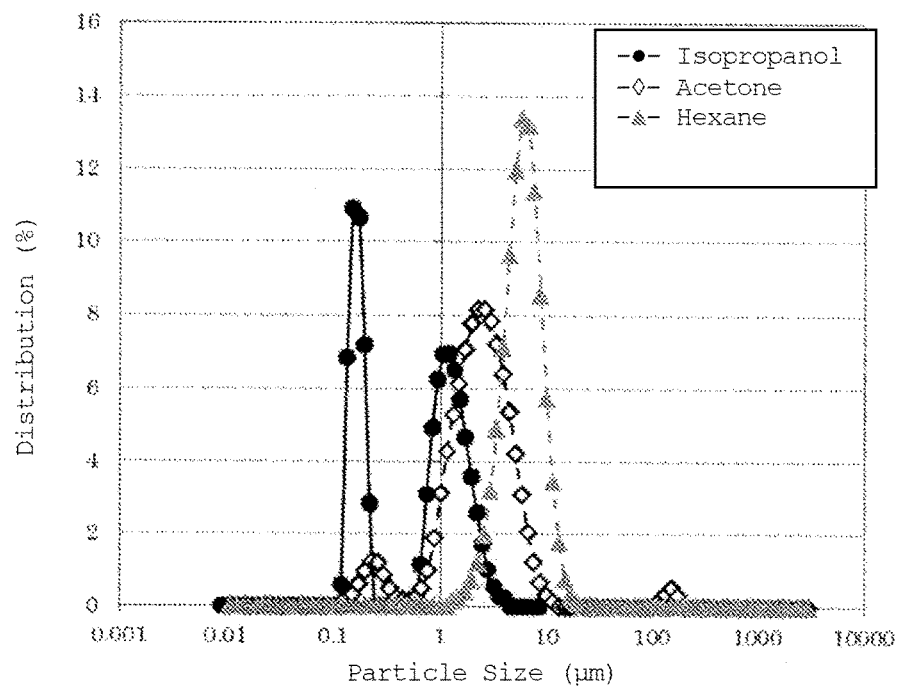
FIG. 4 is a graph showing the measurement results of particle size distribution measured in Example 4.

Each of the samples was subjected to a dispersing treatment using the rotor-stator homogenizer to thereby disperse the ultrafine BN powder in the same manner as in Example 1. After the dispersion temperature was stabilized, the dispersion was collected using a dropper, and the particle size of the dispersed particles in the dispersion was determined by a laser scattering light technique. FIG. 4 shows the results.

As is clear from FIG. 4, when hexane or acetone was used as a dispersion medium, the dispersibility of the ultrafine BN particles was unsatisfactory. When acetone was used as a dispersion medium, a peak was observed at a particle size of about 2 μm, and when hexane was used as a dispersion medium, a peak was observed at a particle size of about 6 μm. In each case, aggregated ultrafine BN particles were present in a significant amount.

In contrast, when isopropanol was used as a dispersion medium, a peak was observed at a particle size of about 100 nm, which indicates that the dispersibility of the ultrafine BN particles was improved.

EXAMPLE 5

0.3 g of an ultrafine BN powder was added to a beaker containing 100 ml of pure water. The ultrafine BN powder added was the same as that used in Example 4. One or both of polyethylenimine and alkyl glycoside were added to the beaker in the same manner as in Example 2. Polyethylenimine and alkyl glycoside were added in the following three different patterns.
(1) 0.009 g of polyethylenimine
(2) 0.009 g of alkyl glycoside
(3) 0.006 g of polyethylenimine
(4) 0.003 g of alkyl glycoside Each sample was subjected to a dispersing treatment using the rotor-stator homogenizer in the same manner as in Example 1 to disperse the ultrafine BN powder.

Figure 5:
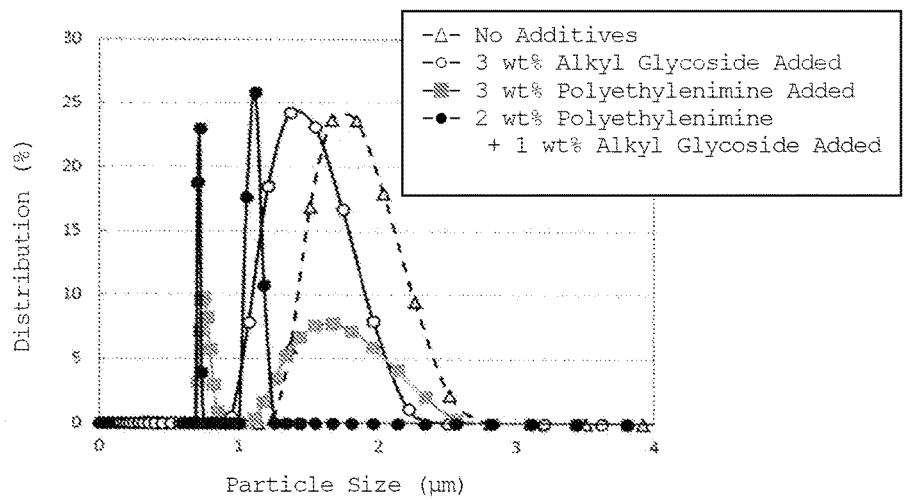
FIG. 5 is a graph showing the measurement results of particle size distribution measured in Example 5.

After completion of the dispersing treatment, the dispersion was collected using a dropper, and the particle size of the dispersed particles in the dispersion was determined by a laser scattering light technique with the same analyzer used in Example 1. FIG. 5 shows the results.

As is clear from FIG. 5, when water was used as a dispersion medium without adding polyethylenimine and alkyl glycoside, the particles that were dispersed in the formed dispersion had a large particle size and a wide particle size distribution width.

In contrast, when polyethylenimine or alkyl glycoside was added, the homogeneity of the dispersed particles was improved. In particular, when both polyethylenimine and alkyl glycoside were added at the same time, peaks were observed near a particle size of 1 μm and near a particle size of several hundred nanometers, which indicates that the dispersibility of the ultrafine BN particles was improved.

TEST EXAMPLE 1

Measurement of Zeta Potential (1) Measurement of the Zeta Potential of Ultrafine SiC Particles 0.3 g of the same ultrafine SiC particles used in Example 1 and 100 g of pure water were added to a beaker, thereby preparing a sample. 0.006 g of polyethylenimine and 0.003 g of alkyl glycoside, which are both the same as those used in Example 2, were further added to the former sample, thereby preparing another sample.

Each of the samples was subjected to a dispersing treatment using the rotor-stator homogenizer in the same manner as in Example 1 to prepare a dispersion.

Each of the obtained dispersions was allowed to stand for 30 minutes, and each of the supernatants was divided into two portions. One portion of the supernatant was adjusted to a pH of 2 to 6 with a 0.1 M hydrochloric acid, and the other portion of the supernatant was adjusted to a pH of 7 to 11 with a 0.1 M sodium hydroxide. The zeta potential of each of the dispersions having a different pH was measured three times, and the average was determined.

Figure 6:
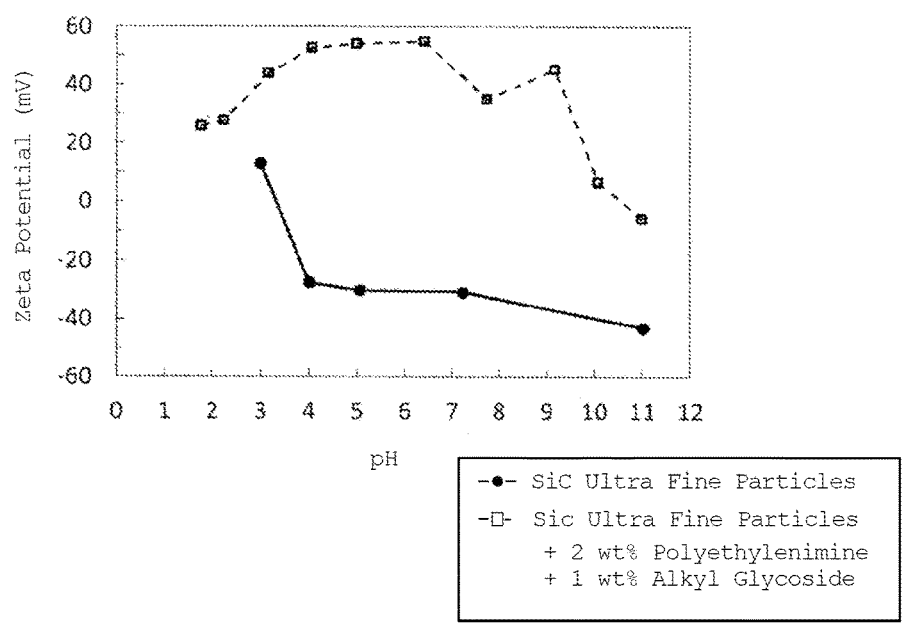
FIG. 6 is a graph showing the measurement results of the zeta potential of ultrafine SiC particles measured in Test Example 1.

As used herein, the "zeta potential" is a value determined at room temperature with an electrophoretic light scattering analizer (Horiba, Ltd., nano Partica SZ-100). FIG. 6 shows the results.

As is clear from FIG. 6, the zeta potential of the ultrafine SiC particles in the dispersion varied from the positive to the negative within the pH range of 2 to 11. In contrast, in the dispersion to which polyethylenimine and alkyl glycoside were added, the zeta potential of the ultrafine SiC particles was positive within the pH range of 2 to 9, achieving large values.

The phenomena appears to be the reason why an excellent dispersion was formed when polyethylenimine and alkyl glycoside were added.

(2) Measurement of the Zeta Potential of Ultrafine EN Particles 0.3 g of the same ultrafine BN particles used in Example 4 and 100 g of pure water were added to a beaker, thereby preparing a sample. 0.006 g of polyethylenimine and 0.003 g of alkyl glycoside, which are both the same as those used in Example 2, were added to the former sample, thereby preparing another sample.

Figure 7:
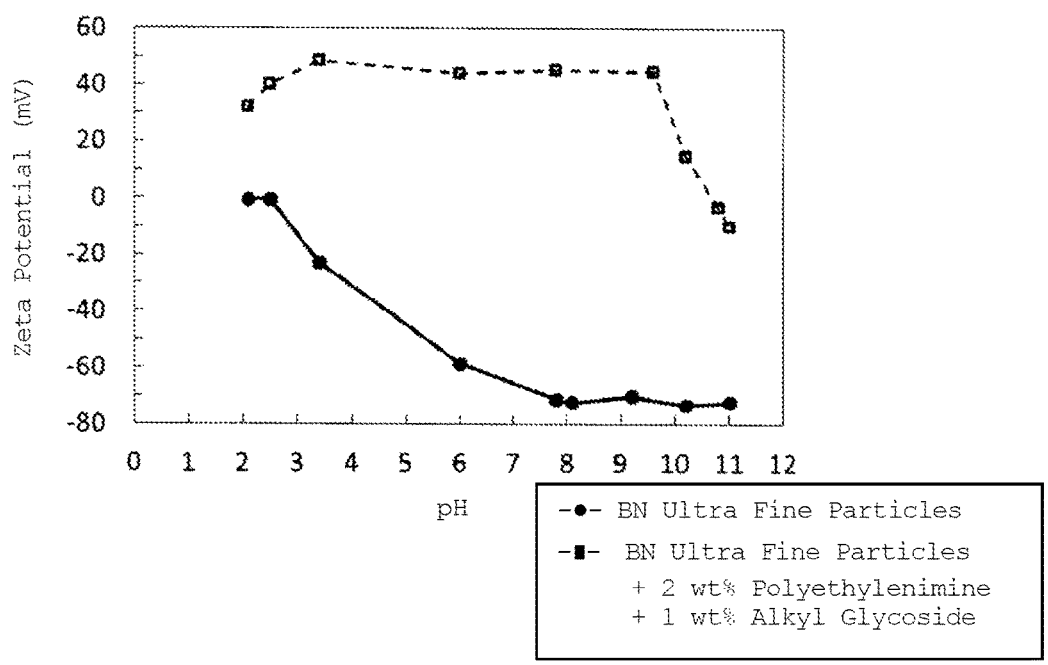
FIG. 7 is a graph showing the measurement results of the zeta potential of ultrafine BN particles measured in Test Example 1.

Each sample was formed into a dispersion in the same manner as in the Measurement of the Zeta Potential of Ultrafine SiC Particles described above, and the zeta potential of the ultrafine EN particles was measured. FIG. 7 shows the results.

As is clear from FIG. 7, when polyethylenimine and alkyl glycoside were not added to the dispersion of ultrafine BN particles, the zeta potential varied from the positive to the negative within the pH range of 2 to 11 as with the dispersion of ultrafine SiC particles.

In contrast, when polyethylenimine and alkyl glycoside were added to the dispersion, the zeta potential of the ultrafine BN particles was positive within the pH range of 2 to 9, with the values being stable.

The invention claimed is:

1. A method for producing a dispersion of fine ceramic particles, the method comprising:
adding fine ceramic particles having a mean particle size of less than 1 μm to a lower alcohol dispersion medium; and
dispersing the fine ceramic particles in the dispersion medium using a rotor-stator homogenizer;
wherein said fine ceramic particles are either fine silicon carbide particles or fine boron nitride particles, said fine ceramic particles have a mean particle size of 300 nm or less and said fine ceramic particles are dispersed while the temperature of the dispersion is being controlled to 40° C. or less and wherein the step of dispersing is conducted using said rotor-stator homogenizer at a rotation speed within the range of 500 to 2500 rpm.

2. The method for producing a dispersion of fine ceramic particles according to claim 1, wherein the lower alcohol is isopropyl alcohol.

3. A method for producing a dispersion of fine ceramic particles, the method comprising:
adding fine ceramic particles having a mean particle size of less than 1 μm to a water dispersion medium; and,
dispersing the fine ceramic particles in the dispersion medium using a rotor-stator homogenizer;
wherein the fine ceramic particles are either fine silicon carbide particles or fine boron nitride particles, the fine ceramic particles having a mean particle size of 300 nm or less;
wherein the pH of the dispersion is not less than 2, and,
wherein the fine ceramic particles are dispersed in the presence of a polymeric dispersant containing cationic groups and wherein the step of dispersing is conducted using said rotor-stator homogenizer at a rotation speed within the range of 500 to 2500 rpm.

4. The method according to claim 3, wherein the dispersion has a pH of 2 to 9.

5. The method according to claim 3, wherein the polymeric dispersant is polyethylenimine.

6. The method according to claim 3, wherein the fine ceramic articles are dispersed in the presence of both the polymeric dispersant and a surfactant.

7. The method according to claim 6, wherein the surfactant is a nonionic surfactant.

8. The method according to claim 6, wherein the surfactant is an alkyl glycoside.

9. The method according to claim 1, wherein the rotation speed is within the range of 500 rpm to less than 3,200 rpm.

10. The method according to claim 3, wherein the rotation speed is within the range of 500 rpm to less than 3,200 rpm.

* * * * *